US011833578B2

(12) United States Patent
Oleff et al.

(10) Patent No.: US 11,833,578 B2
(45) Date of Patent: Dec. 5, 2023

(54) SETTING HEAD, SHEET METAL PRESS OR SETTING DEVICE HAVING THIS SETTING HEAD, AND A METHOD FOR JOINING A JOINING ELEMENT WITH THE SETTING HEAD

(71) Applicant: Böllhoff Verbindungstechnik GmbH, Bielefeld (DE)

(72) Inventors: Nils Oleff, Bünde (DE); Bernd Haesler, Halle (DE); Dennis Schröder, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 33 days.

(21) Appl. No.: 17/604,306

(22) PCT Filed: Mar. 18, 2020

(86) PCT No.: PCT/EP2020/057375
§ 371 (c)(1),
(2) Date: Oct. 15, 2021

(87) PCT Pub. No.: WO2020/212055
PCT Pub. Date: Oct. 22, 2020

(65) Prior Publication Data
US 2022/0184689 A1 Jun. 16, 2022

(30) Foreign Application Priority Data
Apr. 16, 2019 (DE) ...................... 10 2019 110 011.9

(51) Int. Cl.
*B21J 15/32* (2006.01)
*B21J 15/02* (2006.01)
(Continued)

(52) U.S. Cl.
CPC ............. *B21J 15/32* (2013.01); *B21J 15/025* (2013.01); *B23K 9/201* (2013.01); *B23K 9/206* (2013.01); *B25B 23/10* (2013.01)

(58) Field of Classification Search
CPC ......... B21J 15/32; B21J 15/025; B23K 9/201; B23K 9/206; B25B 23/10
See application file for complete search history.

(56) References Cited

U.S. PATENT DOCUMENTS 3,526,943 A * 9/1970 Erhardt, Jr. .......... C07D 307/14
72/478
5,636,426 A * 6/1997 Luckhardt ............. B23P 19/006
29/243.517

(Continued)

FOREIGN PATENT DOCUMENTS

CN 106029252 A 10/2016
DE 1926573 A1 7/1970
(Continued)

OTHER PUBLICATIONS

Geisler; DE 2200128; Screw holder on Screwing Device; Nov. 1972; EPO English Machine Translation; pp. 1 and 2 (Year: 2023).*
(Continued)

*Primary Examiner* — Bayan Salone
(74) *Attorney, Agent, or Firm* — Reising Ethington P.C.

(57) ABSTRACT

A setting head for a joining device, such as a press or a setting device, which setting head comprises the following features: a punch which is movable in a longitudinal direction such that a joining element can be joined into a component by means of a punch face arranged at a working end of the punch; a hollow cylindrical receiving sleeve which has a through-passage and which, with the punch in the through-passage, is guided adjacent to the working end of the punch concentrically and axially movably thereon; and two mutually opposite holding arms arranged on the (Continued)

Figure 1:
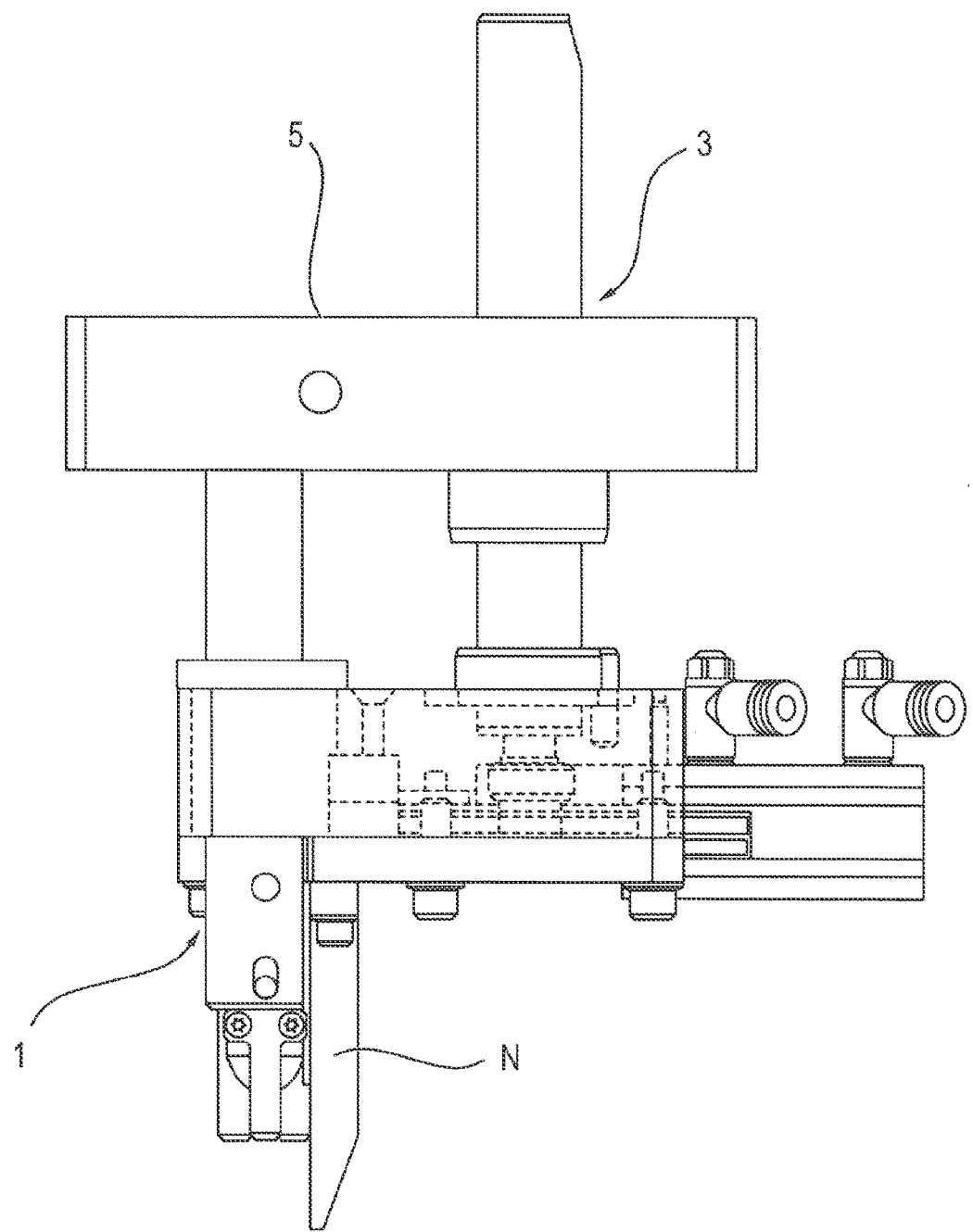

receiving sleeve outside the through-passage each provide at least one laterally inwardly projecting holding end, with the result that the at least two holding ends allow the joining element to be releasably positionable adjacent to a punch-remote outlet opening of the through-passage and by the axially movable working end of the punch.

14 Claims, 9 Drawing Sheets

(51) Int. Cl.
*B23K 9/20* (2006.01)
*B25B 23/10* (2006.01)

(56) References Cited

U.S. PATENT DOCUMENTS

| | | | | |
|---|---|---|---|---|
| 5,953,813 | A * | 9/1999 | Sickels | B21J 15/32 |
| | | | | 269/254 R |
| 6,263,561 | B1 * | 7/2001 | Sickels | B25B 23/04 |
| | | | | 269/254 R |
| 8,312,622 | B2 * | 11/2012 | Schmidt | B21J 15/10 |
| | | | | 29/505 |
| 10,307,815 | B2 * | 6/2019 | Badent | B21J 15/025 |
| 2016/0346829 | A1 * | 12/2016 | Badent | B21J 15/32 |

FOREIGN PATENT DOCUMENTS

| | | | | | |
|---|---|---|---|---|---|
| DE | 2200128 | A1 | * | 11/1972 | |
| DE | 2200128 | A1 | | 11/1972 | |
| DE | 3718405 | A1 | | 2/1989 | |
| DE | 69212642 | T2 | | 1/1997 | |
| DE | 102015108621 | A1 | * | 12/2016 | |
| DE | 102015108621 | A1 | | 12/2016 | |
| DE | 102017205263 | A1 | * | 10/2018 | ........... B21J 15/025 |
| DE | 102017205263 | A1 | | 10/2018 | |
| EP | 0553529 | B1 | | 8/1996 | |
| EP | 1350583 | A1 | * | 10/2003 | ............. B21J 15/10 |
| EP | 1350583 | A1 | | 10/2003 | |
| EP | 0755749 | B2 | | 6/2006 | |
| GB | 825223 | A | | 12/1959 | |
| GB | 825223 | A | * | 12/1959 | |
| JP | H05208328 | A | | 8/1993 | |
| JP | H05208328 | A | * | 8/1993 | |
| WO | WO9319890 | A1 | | 10/1993 | |
| WO | WO-9319890 | A1 | * | 10/1993 | ............. B21J 15/32 |

OTHER PUBLICATIONS

Schmidt; EP1350583A1; Punch head, machining tool comprising such a punch head as well as machining equipment comprising such a punch head or machining tool; Oct. 8, 2003; EPO English Machine Translation; pp. 1-11 (Year: 2023).*

Written Opinion & International Search Report for PCT/EP2020/057375 dated Jun. 22, 2020, (15 pages).

English translation of the International Preliminary Report on Patentability for PCT/EP2020/057375 dated Sep. 28, 2021, (8 pages).

CN Office Action for CN Application No. 202080029130.1 dated Feb. 3, 2023, (8 pages).

* cited by examiner

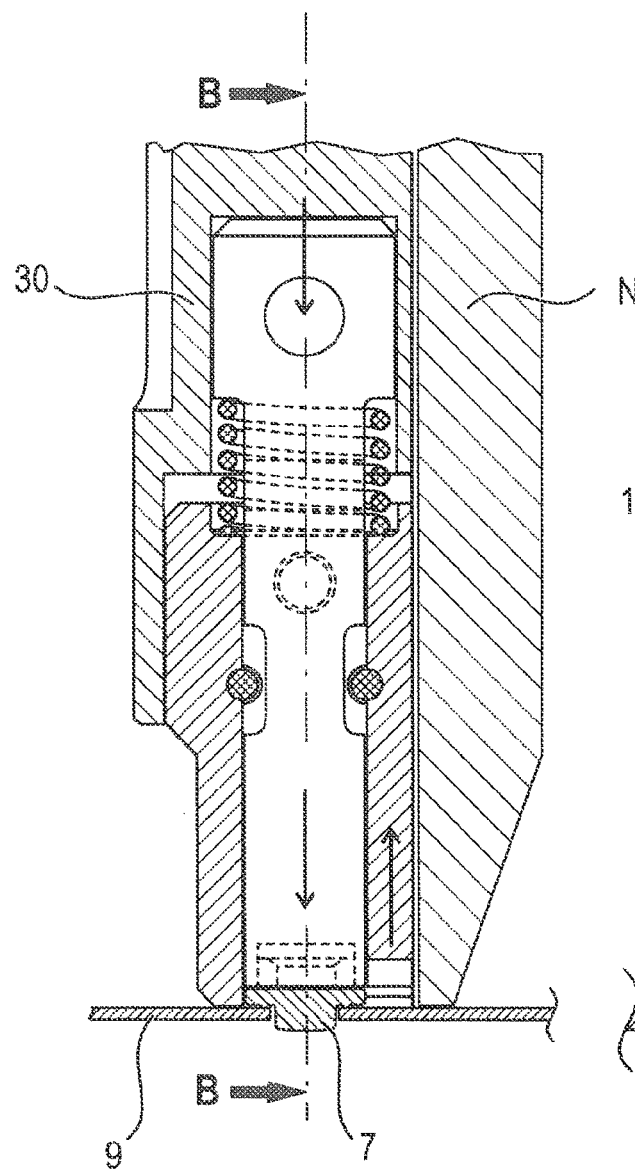
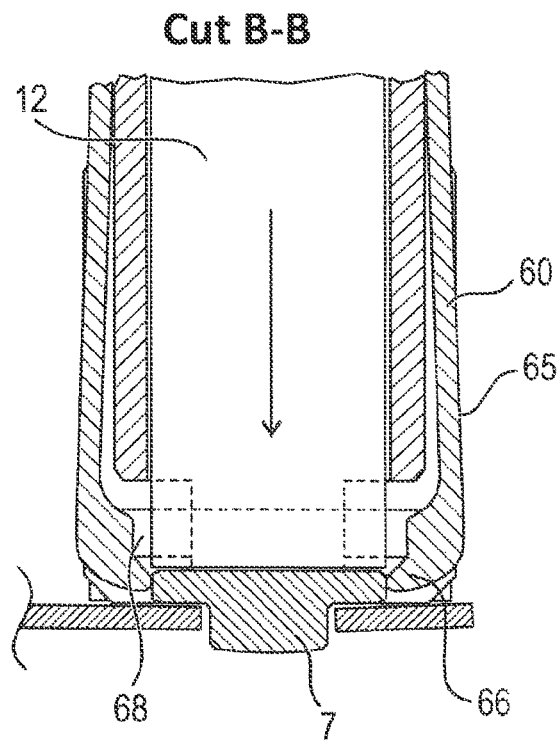
FIG. 5 a
FIG. 5 b

SETTING HEAD, SHEET METAL PRESS OR SETTING DEVICE HAVING THIS SETTING HEAD, AND A METHOD FOR JOINING A JOINING ELEMENT WITH THE SETTING HEAD

1. TECHNICAL FIELD

The present disclosure relates to a setting head for a joining device, such as a press or a setting device, with which a joining element, as for example a welding auxiliary joining part, a punch rivet or a bolt, is joinable into at least one component. Furthermore, the present disclosure relates to a sheet metal press or a setting device in combination with this setting head. Finally, the present disclosure includes a joining method of a joining element, which may be a welding auxiliary joining part, with this setting head.

2. BACKGROUND

In the state of the art, different joining devices with setting head are used. They serve for the inserting of a joining element. A corresponding example is a punch rivet setting device for setting a punch rivet, e.g. into a stack of two sheet metal parts. Furthermore, such setting heads are used when clinching or when setting or firing joining elements for manufacturing a component bond.

If for example, reference is made to a punch rivet setting device, the hydraulically or pneumatically or electrically driven punch moves through a joining channel in order to set a punch rivet. Before the start of the setting process, the punch rivet is often shot pneumatically under the punch surface of the punch in the joining channel. From this position, where the punch rivet is for example held by a braking distance or otherwise, the operating surface of the punch pushes the punch rivet in front of it in the joining direction through the joining channel and finally presses it into the components.

In order to be able to set the joining elements in a correctly positioned way into the components, they must be arranged in an oriented fitted manner in the joining channel of the setting head. Furthermore, it is necessary that during the movement of the punch in the joining direction, namely during the setting process, the orientation of the joining element remains upheld so that a reliable joining connection can be established. Because as soon as the joining element rotates or reorientates itself in the joining channel, the setting head, the joining channel or the punch surface of the punch can be damaged beside a bad joining connection, too. Apart from a reject part, this leads to possible times of stand still of the joining device in order to service the setting head.

In order to avoid such situations, WO 93/19890 discloses a holding device for holding, guiding and automatic releasing of joining and auxiliary joining parts, as for example nuts, bolts, rivets, in a device for impressing or fastening, respectively, of the joining parts at a sheet metal. In this context, the main target of this device is to maintain a position defined by the delivery of the joining element until the actual impressing of the element into a component. For this purpose, two holding claws are pivotally hinged at the punch that is moved in the joining channel of the setting head. In this way, the holding claws can pivot between a closing position in which they hold the joining element at the punch, and an opening position in which they release the joining element from the closing position. An enforced guiding or restricted guidance of the holding claws guarantees that at a specific position of the punch, the holding claws are pivoted in a defined manner in order to change from the closing position into the opening position. This restricted guidance arises due to a specific shape of the inner wall of the joining channel as well as a specific shape of the outside of the holding claws adjacent to the inner wall. As the holding claws are fastened at the punch, they are permanently co-moved with the punch. Accordingly, a permanent friction takes place between the punch construction with holding claws and the inner wall of the joining channel. The forces acting during the setting, which also provide for the opening and closing of the holding claws, also result in a critical wear. Consequently, the joining element is lost in an uncontrolled manner from the closing position depending on the degree of the wear, which leads to a bad joining location and/or to a damaging of the punch and of the setting head.

A similar construction is described in EP 0 755 749 B2. Here again, the punch of a press setting head is guided in a fixed joining channel of the setting head. Just as the punch, the joining channel has a foursquare cross section. Holding fingers which are movable axially with the punch are provided at two opposite inner sides in corresponding clearances. These holding fingers are limited in a form-fit manner as regards their axial movement relatively to the punch, as they engage into reverse clearances at the outside of the punch and at the inside of the joining channel at the same time. The joining element is laterally delivered into the joining channel and away from the punch exit opening. There, the joining element is on the one hand held by balls or webs which are laterally arranged in a movable manner in the holding fingers and on the other hand held by the punch surface.

Disadvantageously, the punch can release the joining element from the holding fingers only when the blocking balls or webs are released by a further clearance at the inside of the joining channel. Tolerances at the height of the joining element may lead to additional frictional forces and wear between the holding fingers and the joining channel. In addition, the joining element is released at a distance to the component from the holding fingers. Accordingly, it can tilt under the punch surface or reorient its position in general, which leads to a defective joining connection. Furthermore, here, the disadvantage also arises that the punch in combination with the holding fingers is moved under permanent friction with the inner surface of the joining channel within the joining channel. This leads to wear, staining in the joining channel and to the generation of tolerances regarding the leeway of the holding fingers. Accordingly, a high maintenance effort is connected with this construction. Furthermore, the danger of a lacking positioning ability of the joining elements as well as a non-reliable hold of the joining element in advance of the establishing of a joining connection increases. The defective hold of the joining element may not guarantee the necessary anti-loss security which may be during the operation of a setting head in combination with a press. Due to the active, high operating forces of a press in the two- to three-digit tonne range, the anti-loss security has a special meaning. Because a lost joining element or a mis-positioned joining element often leads to big damages at the press as well as sensitive, high maintenance idle times of a press or of a processing street with a number of presses.

It is therefore the object of at least some implementations of the present disclosure to suggest an alternative setting head for a press or a joining device which guarantees a reliable delivery of a joining element and a subsequent joining method without the above-mentioned disadvantages.

3. SUMMARY

The above object is solved by a setting head for a joining device, which may be a press or a setting device, by a metal sheet press or a setting device with this setting head as well as by a joining method of a joining element, such as a welding auxiliary joining part, with this setting head. Further embodiments and developments of the present disclosure result from the following description, the accompanying drawings as well as the appending claims.

The setting head for a joining device includes the following features: a punch movable in longitudinal direction, so that a joining element is joinable into a component via a punch surface arranged at a working end of the punch, a receiving sleeve, which may have a hollow cylindrically formed design or a block-like form with inner channel, with a passage channel, the sleeve being concentrically and axially movable with the punch in the passage channel adjacent to the working end of the punch on the same, and two holding arms being arranged opposite to each other and outside of the passage channel at the receiving sleeve each provide at least one laterally inwardly protruding holding end, so that with the at least two holding ends, the joining element is positionable adjacent to an exit opening, facing away from the punch, of the passage channel and releasably by the axially movable working end of the punch.

The setting head is characterized by a combination of the moveable punch with a receiving sleeve. The receiving sleeve has a hollow cylindrically formed design so that it can receive the punch in a passage channel. In this connection, hollow cylindrically formed refers to the presence of an inner channel and an outer side extending which may be parallel to it, at least in sections. The inner channel, or also called passage channel, may be provided with a round or non-round cross-section. A punch (see below) of complementary form is guided in it.

Within the passage channel, the punch is axially movable mostly freely. Only a form-fit connection between receiving sleeve and punch guarantees that the relative movability of punch and receiving sleeve with respect to each other are limited to a specific distance or length. On the one hand, this limited relative adjustment track or path between receiving sleeve and punch guarantees the adopting of a rest position of the punch for the delivery of a joining element to be set anew. Furthermore, this limited relative moving or shifting guarantees an achieving of an operating position of the punch with respect to the receiving sleeve, so that a joining element can be set reliably.

Beside the receiving of the punch in the passage channel, the receiving sleeve serves for the receiving and holding of a joining element in preparation of a joining process or a setting process, respectively, adjacent to the exit opening of the passage channel. Because during a setting process of the punch, the working end of the punch may pass through the exit opening, taking along the pre-positioned joining element, and presses it into the adjacent component. This pre-positioning of the joining element may be guaranteed by holding arms which are fastened outside of the passage channel and of a joining channel of the setting head at the receiving sleeve. In this way, the holding arms and the punch as well as the inner wall of the passage channel are movable independently from each other such that wear and friction losses of components moved in mutual contact are minimized.

Nevertheless, the holding arms which are arranged outside of the passage channel are properly shaped in order to position the joining element suitably in front of the working end or the punch surface, respectively, seen in the joining direction, and in order to prepare an upcoming joining process. For this purpose, one respective functional end of the holding arms holding the joining element reaches under the punch in the joining directions, in order to hold the joining element releasably in a manner ready to be received by the punch surface. The corresponding holding position of the joining element may lie within or outside of the passage channel of the receiving sleeve.

A further advantage of the arrangement of the holding arms outside of the passage channel is the easy accessibility of these holding arms. Because in case of a possibly arising wear, these holding arms are interchangeable without any further ado due to their easy accessibility, which reduces times of standstill of a press or a setting device compared with known setting head constructions.

According to a further design of the setting head, the receiving sleeve is spring-pretensioned relative to the punch and movable limitedly in the longitudinal direction of the punch, so that in a rest position of the punch, the working end of the punch is arranged within the passage channel and at a distance to its exit opening and in an operating position of the punch adjacent to the exit opening, which may be within or outside of the passage channel.

The receiving sleeve and the punch are connected with each other which may be in a form-fit manner, such that a certain relative movement in the longitudinal direction of the punch between receiving sleeve and punch is guaranteed. This relative movement guarantees that the punch can assume a rest position and an operating position. Depending on the rest position and the operating position of the punch, the receiving sleeve is also positioned suitably, as its position should guarantee an undisturbed delivery of a new joining element on the one hand or on the other hand, the positioning of the joining element under the punch surface, thereby guaranteeing a smooth processing of a joining process. The used form-fit connection between receiving sleeve and punch may additionally fix the extent of the relative movement to a minimum, so that for the relative displacement of punch and receiving sleeve with respect to one another, a minimum of time and space may be necessary. In turn, this may have a favorable effect on cycle times to be reached of a joining device when manufacturing several consecutive joining connections. For setting a welding auxiliary joining part or generally a group of joining elements, the punch may not leave the passage channel with its punch surface until the termination or completion of the joining process. Accordingly, the punch surface may not pass an exit opening of the passage channel of the receiving sleeve in this configuration. This arrangement may be used during an operation of the setting head in a press. According to a further configuration, the punch may pass the exit opening of the passage channel of the receiving sleeve until the completion of the joining process of a joining element into a component. This construction is of advantage when a setting head may be removed laterally from the joint after the joining and thus, a head of the joining element does not collide with the receiving sleeve.

According to a further embodiment of the setting head, the receiving sleeve and the punch are guided in a form-fit manner next to each other, so that the receiving sleeve is axially displaceable in a rotation-free manner relative to the punch.

It was already mentioned above that the form-fit connection between receiving sleeve and punch may specifically limit a relative displacement between the receiving sleeve and the punch. Furthermore, the form-fit may guarantee that a relative rotation between receiving sleeve and punch is prevented. In this way, the pre-positioned joining element maintains its spatial orientation and arrangement with respect to the working end of the punch. Furthermore, the limitation to only the most necessary relative movements between receiving sleeve and punch provides for a minimum wear as well as friction losses connected with that. Furthermore, this has a positive effect on the maintenance effort to be provided in the later operation.

According to a further embodiment of the setting head, the holding arms may be provided L-shaped and a shorter L-leg projects laterally inwardly with a holding-releasing contour for the joining element into the passage channel of the receiving sleeve. Alternatively, due to their orientation laterally inwardly, the shorter L-legs may arrange the holding-releasing contour for the joining element adjacent to the exit opening but may be outside of the passage channel of the receiving sleeve.

The L-shaped holding arms may be fastened at the outside of the receiving sleeve. Thereby, they guarantee the above-described easy accessibility and the interchangeability which is associated with low effort. Furthermore, this arrangement guarantees that a movement of the punch in the passage channel of the receiving sleeve is not influenced or hindered by the holding arms. The holding arms may have the L-shape already addressed above so that the shorter L-leg can be used for providing the holding-releasing contour for the joining element. This holding-releasing contour guarantees that firstly, by means of a form-fit and/or force-fit connection of the holding contour, an added joining element can reliably be held between the laterally inwardly protruding holding ends. As the holding ends hold the joining element radially inwardly in a springy manner, a force-fit connection between the holding ends and the joining element, which may be released with low effort by the punch, provides for a reliable pre-positioning of the joining element before the working end of the punch. In case a holding contour may be provided in the holding ends, which is adapted in terms of its shape to the joining element to be fixed, the force-fit connection between joining element and holding ends may be supported by an additional form-fit connection.

The releasing contour which is also provided at the holding ends constitutes a shaping in accordance with the movement of the joining working end of the punch. Because in case of a joining process, the working end and specifically, the punch surface with the joining element and thus the joining element moves through between the holding ends in order to release the joining element from the holding-releasing contour and subsequently set it into the component. In this context, when planes, which run towards each other in the joining direction in an inclined manner, are provided at the holding ends, so that with the axial movement of the punch in joining direction, the holding ends may be pressed radially outwardly by the joining element and/or the working end of the punch. With the help of this construction, a releasing movement of the working end of the punch for the joining element out of the connection with the holding end may be integratable continuously into the joining movement of the joining element into the component.

According to a further embodiment of the setting head, the holding-releasing contour may include at least a form-fit hold for the joining element as well as an inclined releasing surface arranged at an acute angle with respect to the joining direction for the punch-sided releasing of the joining element from the holding releasing contour. This special geometric design of the holding ends has already been discussed qualitatively in the previous paragraph.

According to a further configuration, a longer L-leg of the L-shaped holding arm may provide a fastening structure with which the L-shaped leg is fixable interchangeably at the receiving sleeve.

The L-shaped holding arm may be formed by a leaf spring. This leaf spring is fastened at the outside of the receiving sleeve with its longer leg. Such a fastening is for example realized by a screw connection or a locking connection which can be released slightly and closed again in case of a necessary maintenance.

According to a further configuration of the setting head, the receiving sleeve may include a profile track open at one side adjacent to the exit opening of the passage channel, the track being formed at least in sections at opposite sides by the holding ends and with which the joining element can be delivered to a joining position in the joining direction under the punch surface of the punch.

The laterally or radially inwardly protruding holding ends of the holding arms may define a pre-position of the delivered joining element adjacent to the exit opening of the passage channel. Accordingly, the holding ends may be arranged such that the joining element which is pre-positioned and held by the holding ends is arranged within the passage channel and adjacent to the exit opening or outside of the passage channel adjacent to the exit opening. In order to position the joining element with the holding ends in the passage channel, the receiving sleeve includes suitable recesses or windows. These recesses or windows are reached through laterally inwardly by the holding ends in order to hold the joining element. This different pre-position of the joining element due to the corresponding arrangement of the holding ends may be chosen with respect to the component to be joined, the available spatial conditions at the component, the protection of the joining element in the holding position due to outer influences or under consideration of further outer parameters.

Likewise, the holding ends which may be arranged opposite to each other form the part of a profile track via which the joining element can be delivered to a suitable pre-position for the forthcoming joining process. According to a further configuration in this context, the holding ends form at least partly a receiving nest for the joining element to be delivered. This receiving nest defines the pre-position to be assumed by the joining element.

According to a further embodiment, the holding ends may be elastically spring-pretensioned laterally into the passage channel by means of the holding arms. This constructive solution may be based on the provision of the L-shaped holding arms such as leaf springs which, due to their material properties and construction provide the elastic spring pretension of the holding arms.

According to a further configuration of the setting head, the profile track, which may be open at one side, in combination with the spring-pretensioned holding ends, forms the receiving nest for a joining element, into which the joining element is displaceable by means of a mechanical actuator.

The joining element may be shot via a profile hose in the direction of the setting head with the help of pressurized air. The gravitation force may be used for delivering the joining element to the setting head via a suitable arrangement. The added joining element firstly abuts the punch or an adapter piston of the setting head which may be in an operating position. Accordingly, the punch or the adapter piston or another part of the setting head blocks the receiving nest, so that the joining element cannot be moved into the receiving nest. As soon as the receiving nest is free for the delivery of a joining element, the mechanical actuator moves the joining element into the pre-position, which may be into the receiving nest.

Such a mechanical actuator may consist of a pneumatically or hydraulically or electrically driven lever mechanism, e.g. a knee lever mechanism. During the operation of the actuator, the joining element is moved with the actuator such that the actuator displaces the joining element into the receiving nest. As the position of the actuator may be detectable during its movement or a maximum travel of the actuator can be monitored by sensor technology or detected control signals, it may be derived from that whether the joining element has reached the desired pre-position in the receiving nest. Accordingly, ways of acting can be defined in case of a missing reaching of the receiving nest, which restart the delivery of the joining element to the receiving nest, examine or display an incorrect positioning of the joining element or start an error tracking in combination with the delivery of the joining element.

A movement of the actuator may be carried out with its position being monitored, so that a positioning of the joining element inside or outside of the receiving nest can be detected and/or determined.

Furthermore, the present disclosure comprises a metal sheet press in combination with a setting head according to the above-described embodiments.

Furthermore, the present disclosure comprises a setting device with a setting head according to the above-described embodiments.

The present disclosure furthermore includes a joining method of a joining element, such as a welding auxiliary joining part, with a setting head, as has been described above according to different configurations. The joining process includes the following steps: with the punch in a rest position, displacing a joining element into a holding position between the holding ends of the holding arms, moving the punch from the rest position in a joining direction, wherein in the holding position, the joining element is positioned upstream at a distance to the punch surface of the working end of the punch, placing the receiving sleeve, which may be directly or indirectly via the pre-positioned joining element, on a component, after that, displacing the punch in the passage channel relative to the receiving sleeve and against the spring pre-tensioning between the punch and the receiving sleeve and releasing the joining element from the holding position between the holding ends with the working end of the punch and joining the joining element into the component.

The above-described joining method is characterized by the interaction of the different constructive elements of the setting head. Within the course of the joining method that the joining element may be displaced by means of an actuator into the holding position. As a further step of the joining method, a new joining element may be delivered via an element delivery, such as a profile hose, into a pre-position adjacent to the receiving nest, while the punch blocks the receiving nest. Likewise, in the operating position of the punch, another part of the setting head may block the receiving nest for the delivery of the joining element. This may be the adapter piston.

Furthermore, regarding the present joining method that the punch may be moved from an operating position for joining the joining element into the rest position, wherein the punch, supported by the spring pre-tensioning between the punch and the receiving sleeve is removed form-fit in a limited manner at least partly from the passage channel, which may be from an exit opening of the passage channel of the receiving sleeve.

The form-fit connection between receiving sleeve and punch may guarantee the minimum relative displacement between receiving sleeve and punch, which has already been discussed above. In this way, it is guaranteed that with a minimal displacement, the punch can be moved back and forth between the rest position and the operating position. At the same time, this displacement guarantees that with the punch in the rest position, a joining element may be fed to the receiving nest into the pre-position. In the operating position of the punch, it is in turn guaranteed that the joining element be reliably joined into a component out of the receiving nest. If in this case, the punch may be moved into the rest position, directly via a drive or indirectly via a structural component, such as the adapter piston or the like, the punch may be for this purpose displaced partly out of the passage channel of the receiving sleeve contrary to the joining direction. In other words, the working end of the punch is removed from the exit opening of the passage channel of the receiving sleeve. If the punch is displaced directly via a drive or indirectly via a structural component in the joining direction into the operating position, i.e. a joining element is set into a component, the punch is further displaced in the passage channel in the joining direction. During the final joining of the joining element into the component, the punch surface of the working end of the punch is located in the passage channel adjacent to the exit opening or is arranged flush with the same or projects out of the passage channel over the same with one part of the working end.

4. BRIEF DESCRIPTION OF THE DRAWINGS

Figure 2:
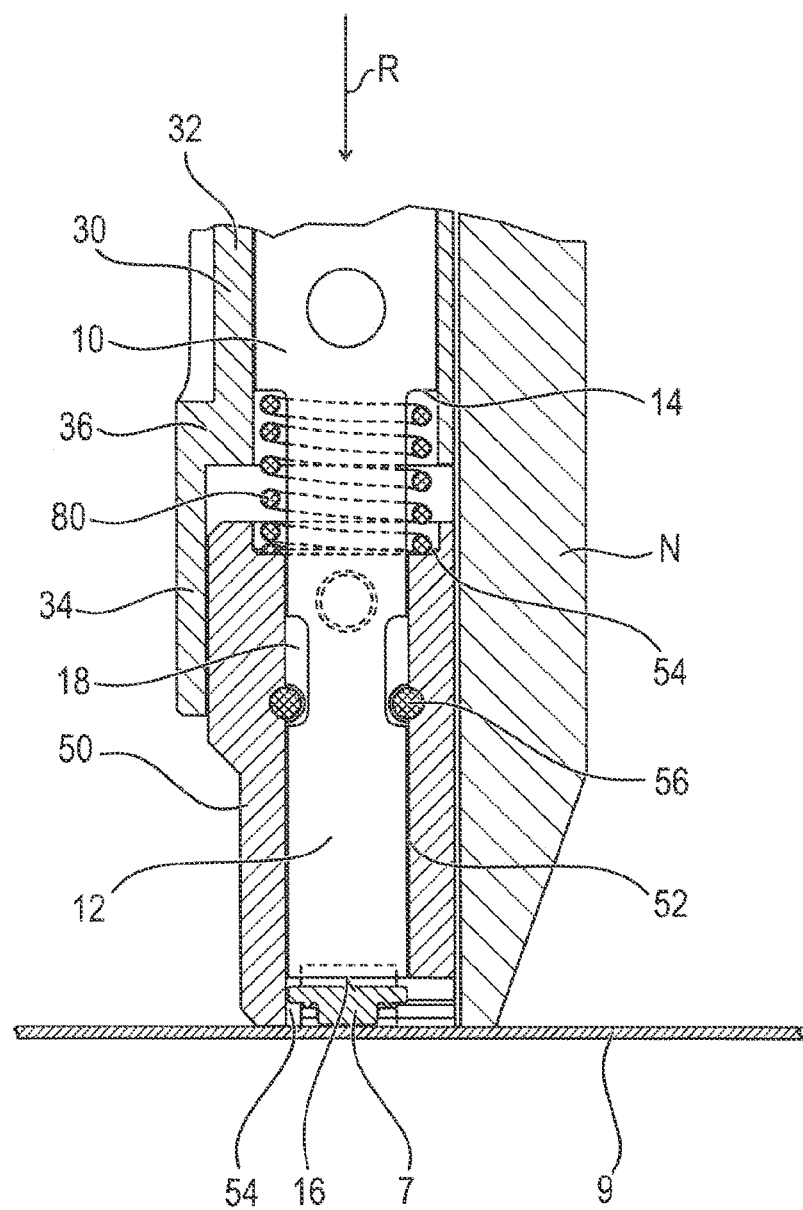
Figure 3:
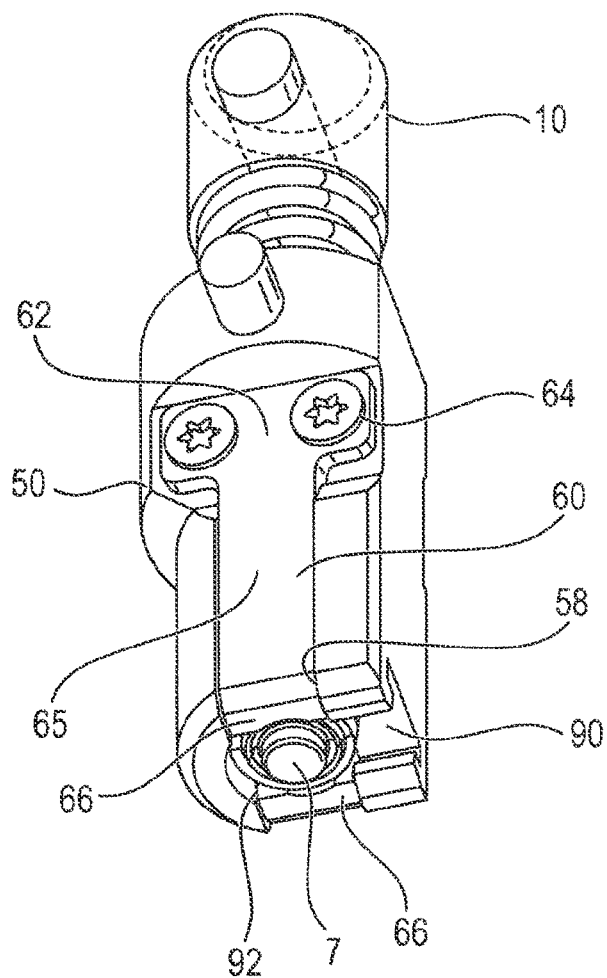
Figure 4:
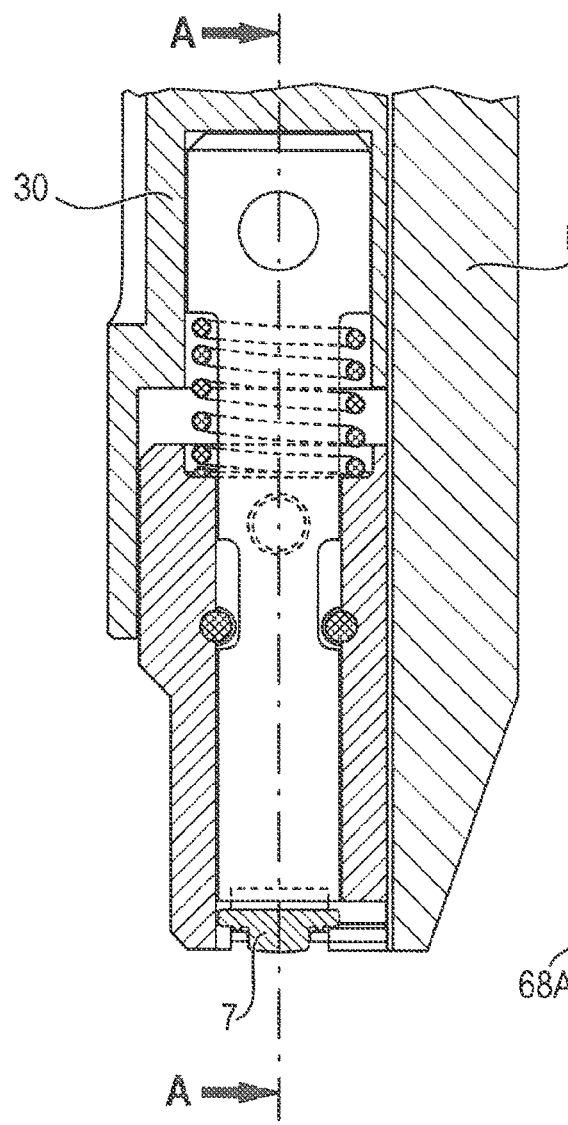
Figure 4:
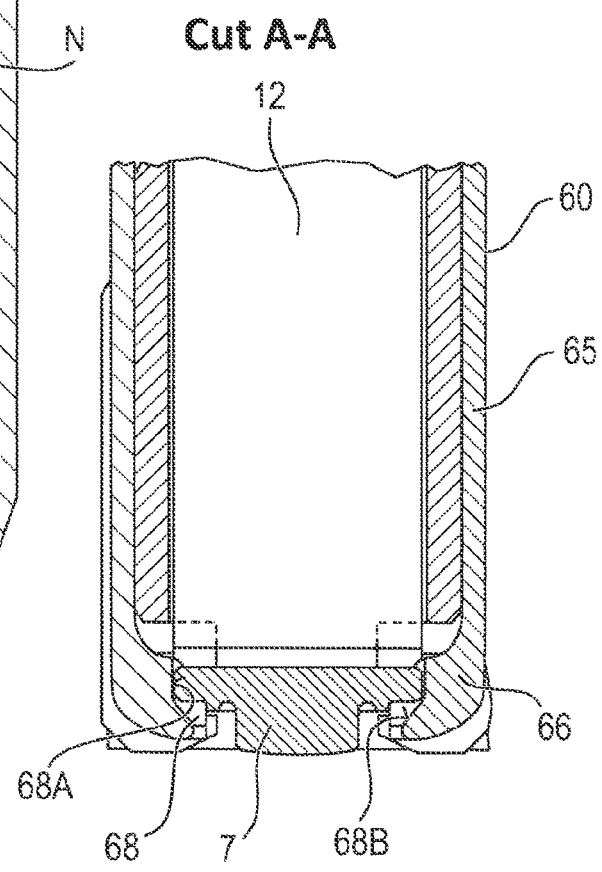
Figure 6:
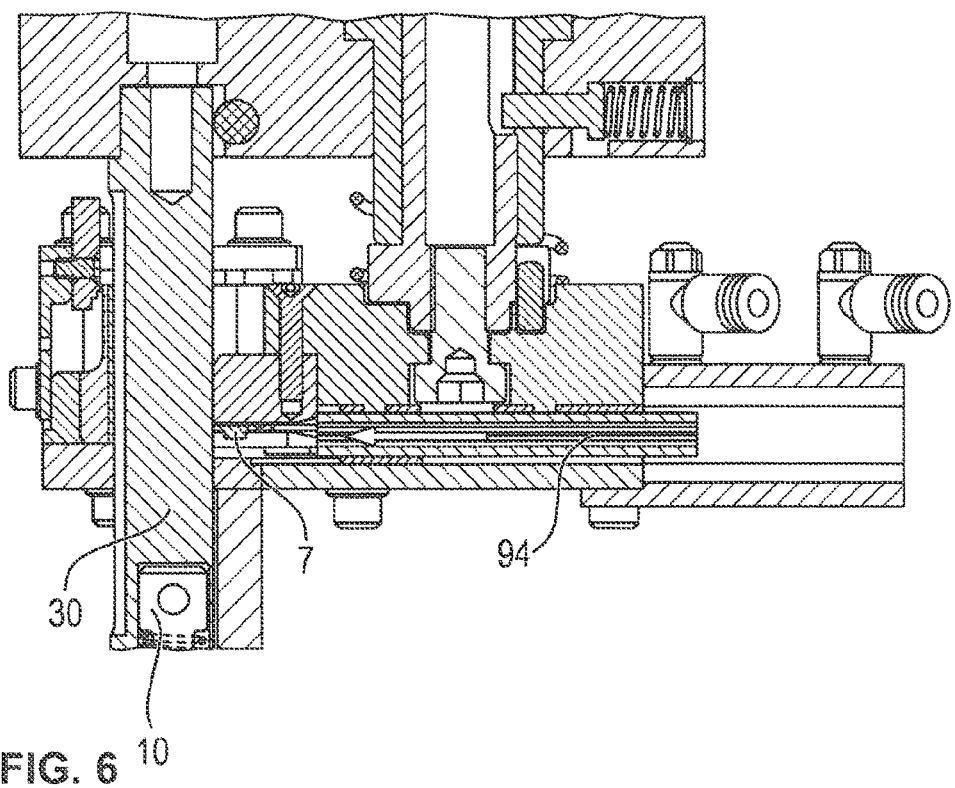
Figure 7:
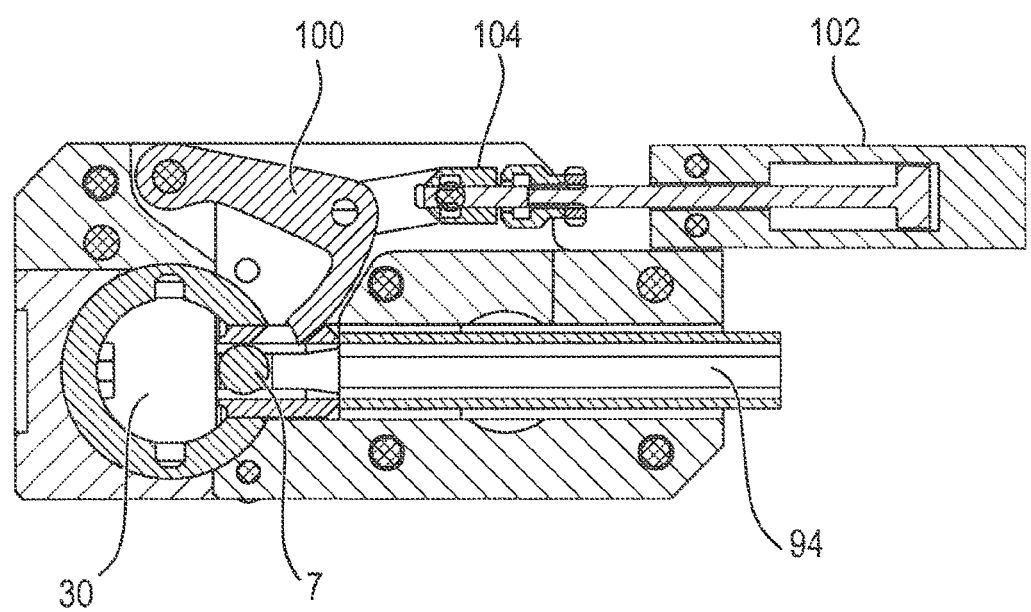
Figure 8:
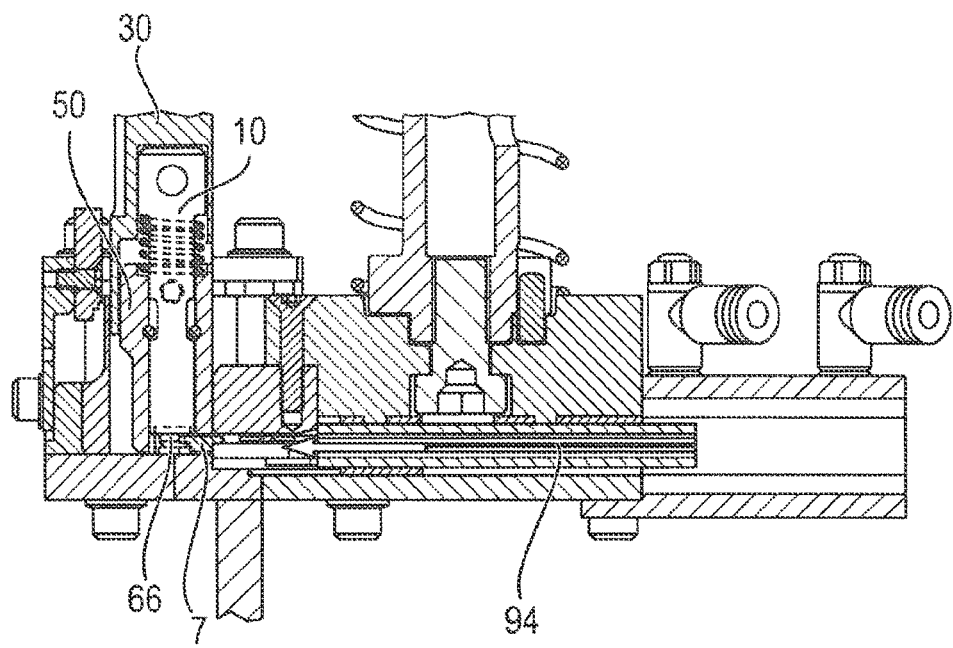
Figure 9:
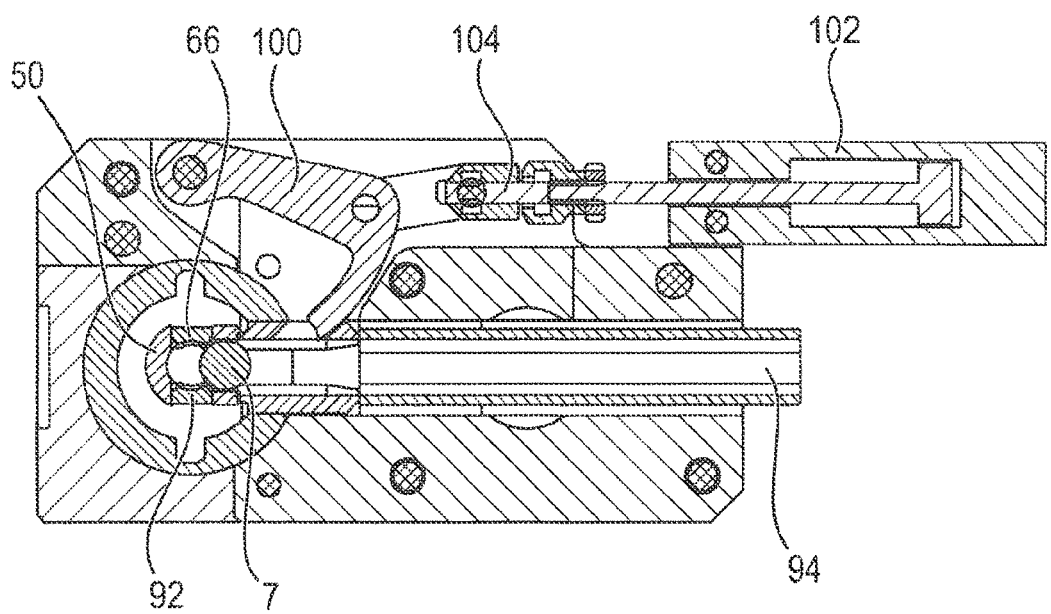
Figure 10:
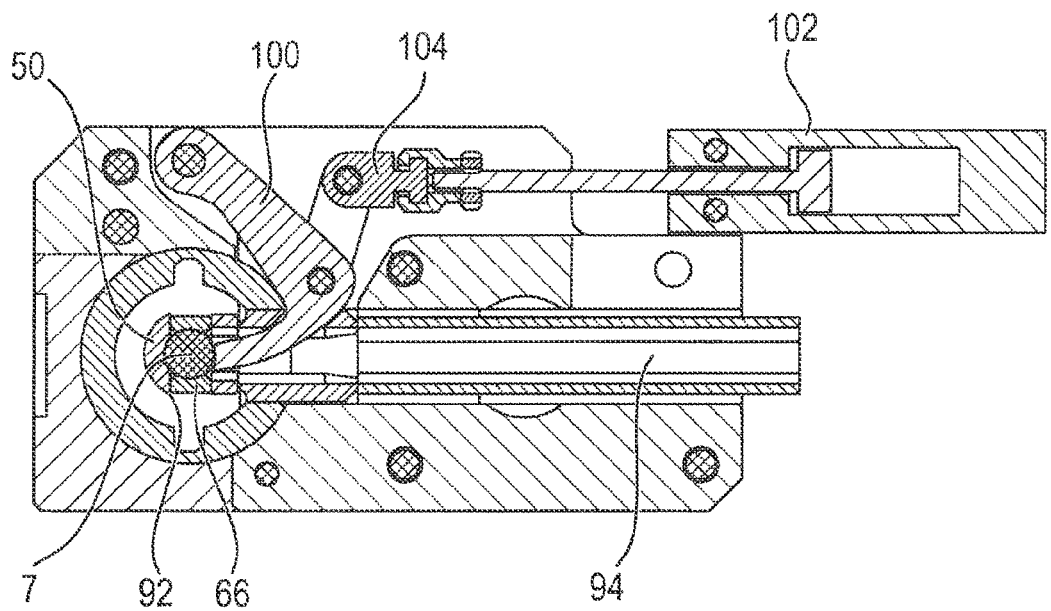
Figure 11:
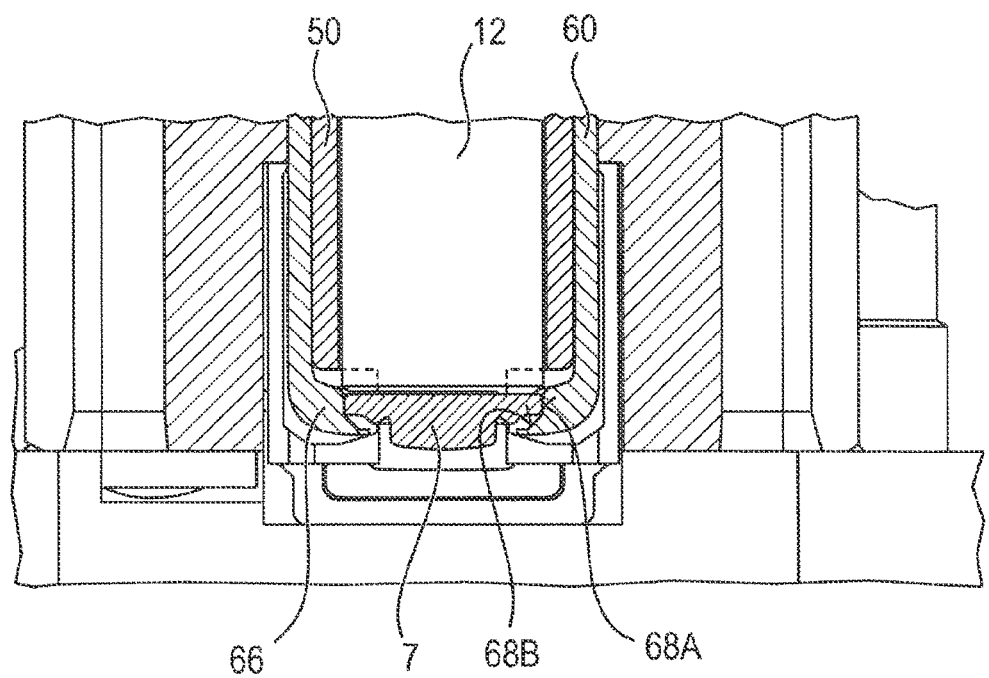
Figure 12:

Embodiments of the present disclosure are described in detail with respect to the accompanying drawings. They show:

FIG. 1 a lateral view of an embodiment of a setting head for a press,

FIG. 2 an enlargement of a section of a combination of the punch with a receiving sleeve in a lateral axial sectional view, in which the punch is drivable directly via a drive unit, FIG. 3 a perspective lateral view of a combination of punch, adapter piston and receiving sleeve with holding arms being arranged at the outside, FIGS. 4*a* and 4*b* a lateral axial sectional view of a combination of punch and receiving sleeve with a joining element in a pre-position and held by the holding ends of the holding arms, in which the punch is drivable indirectly via the adapter piston or another structure, FIGS. 5*a* and 5*b* a lateral axial sectional view of the embodiment according to FIG. 4, with a joining element being set by the movement of the punch into an adjacent component, FIG. 6 a schematic top view onto a delivered joining element which cannot yet be displaced into a pre-position due to the blockage by the adapter piston, FIG. 7 a schematic view of the joining element in a sectional view, positioned in front of a blocked receiving nest (see FIG. 6) between the holding ends of the holding arms, FIG. 8 a schematic top view onto the delivery of the joining element with the mechanical actuator into the joining position in the receiving nest, FIG. 9 a schematic sectional view of the setting head of FIG. 8 along the delivery track of the joining element and in the plane of the receiving nest, FIG. 10 a schematic sectional view of the setting head of FIG. 8 along the delivery track of the joining element and in the plane of the receiving nest, while the actuator moves the joining element into the receiving nest, FIG. 11 an axial sectional view along the punch axis, which shows the joining element in the receiving nest according to FIG. 10, and FIG. 12 a flow diagram of an embodiment of the connection method.

5. DETAILED DESCRIPTION

FIG. 1 shows a setting head 1 which may be used into different joining devices in configurations. The setting head 1 of FIG. 1 is, with a telescope unit 3 and the schematically illustrated upper beam 5 of a press (not shown), adapted to the use in a press tool. Such press tools are for example used in the vehicle construction or wagon construction. Beside the joining of a joining element by the setting head 1, these press tools serve at the same time for the specific forming of metal sheets, which for example form the later vehicle construction.

If the metal sheets to be formed by the press consist of a non-weldable or poorly weldable material, the setting head 1 sets a welding auxiliary joining part 7 out of weldable material into the metal sheet which may be at the same time for the forming of the metal sheet or the component. In doing so, work processes are combined and the further processing of the formed metal sheet is facilitated.

Beside the use of the setting head 1 in a press for setting a welding auxiliary joining part 7, the setting head 1 may be used in a setting device for punch rivets, bolts, nuts, for clinching as well as for carrying out other known connection methods. Accordingly, the setting head 1 joins connecting elements of different configurations into at least one component 9, wherein the punch 10 of the setting head is provided in a rotatable or non-rotatable manner and axially moveably in accordance with the joining element 7 and the joining process.

In the course of the further description, exemplary reference is made to the setting of a welding auxiliary joining part 7 into a component 9. The welding auxiliary joining part 7 serves as an example for any joining element. Likewise, the component 9 serves as an example for only one or a plurality of components.

For preparing a joining process, a downholder N positions on the at least one component 9. Alternatively, the at least one component 9 or a plurality of components may be releasably held by means of suitable clamping devices at a base or a carrier or an ambos.

The setting head 1 is shown in larger detail in FIGS. 2 to 11 in different embodiments. It includes an adapter piston 30 in which the punch 10 is guided in its longitudinal direction in a movable manner—i.e. axially movable.

In known joining device, as for example a punch rivet setting device, the adapter piston 30 forms the joining channel. This joining element is delivered to the joining channel and through it, the joining element is set into the component by the punch 10. For this purpose, the punch 10 may be moved directly via a drive in the joining direction R and contrary to it. A setting head 1 with directly driven punch is suggested in FIG. 2 as there, the adapter piston 30 does not drag along the punch 10 or drives it indirectly. In a press, the punch 10 may not be driven separately within the setting head 1, but jointly guided with the press tool or displaced jointly. Therefore, the punch 10 may be indirectly driven via the adapter piston 30 (cf. FIG. 4). The functionality described in the following and the construction of the setting head 1 may refer in the same way to the direct and the indirect driving possibility of the punch 10.

According to a configuration, the adapter piston 30 guides and holds a receiving sleeve 50 in addition to the punch 10. For this purpose, the adapter piston 30 includes at least two portions 32, 34 being stepped with respect to each other. These stepped portions are separated from each other by the step 36 and include, according to a configuration, guide channels of different diameters. The punch 10 may be guided in the guide channel of the portion 32. The guide channel in the portion 34 guides the receiving sleeve 50.

The receiving sleeve 50 is in turn guided on the punch 10, which may be adjacent to a working end 12 of the punch 10. The punch 10 and a passage channel 52 (see below) of the receiving sleeve 50 may have a round cross section. Therefore, the receiving sleeve 40 may be configured hollow-cylindrically or is at least shaped hollow-cylindrically. Accordingly, the passage channel 52 includes a round inner guiding wall in the cross-section. The outside of the receiving sleeve 50 is also shaped round in the cross section in order to be guided by the adapter piston 30.

Adjustable depending on the application case, the punch 10 may have an angular or generally a non-round cross-sectional form. This leads to a cross-sectional design of the passage channel 52 of the receiving sleeve 50 being correspondingly adapted to the punch form in order to be able to guide the punch 10 and the receiving sleeve 50 reliably next to each other. The outside of the receiving sleeve 50, too, is, in combination with the adapter piston 30, adaptable in terms of its design.

The punch 10 is moved directly via a drive (not shown) or via the adapter piston 30 in a joining direction R and back. According to different configurations, the drive of the punch 10 and thus of the joining device may be electric, hydraulic, pneumatic or mechanic or a combination of them.

The receiving sleeve 50 may be guided by the punch 10 and the adapter piston 30, wherein, a guide through the punch alone would be sufficient, too. For this purpose, the working end 12 of the punch 10 is guided in the passage channel 52 of the receiving sleeve 50. The passage channel 52 is arranged concentrically with respect to the working end 12 of the punch 10 and thus to the punch 10 as a whole.

A spring 80 is arranged between a shoulder 14 of the punch 10, which faces the receiving sleeve 50, and a face side 54, facing the punch 10, of the receiving sleeve 50. The punch 10 and the receiving sleeve 50 are spring pretensioned against each other by means of the spring 80, which may be a screw spring being arranged on the punch 10. As a result, the punch 10 and the receiving sleeve 50 move away from each other, when the working end 12 and/or the receiving sleeve 50 is/are relieved. In this context, relieving means that the punch 10 is moved contrary to the joining direction R after termination or completion of a joining process and thereby releases itself from the joining element 7. The receiving sleeve 50 is relieved when the setting head 1 is moved contrary to the joining direction R so that the receiving sleeve 50 is taken off from the component 9 or relieves the same mechanically.

The pre-tensioning of the spring 80 causes the working end 12 of the punch 10 being partly moved out of the passage channel 52 contrary to the joining direction R in case of the mechanical relieving of receiving sleeve 50 and/or punch 10. As a result, a punch surface 16, with which the welding auxiliary joining part 7 is set into the component 9, is removed from an exit opening 54 of the passage channel 52. By that, a delivery portion for the welding auxiliary joining part 7 adjacent to the exit opening 54 may be released by the working end 12, as is explained further below.

The relative axial displacement, generated by the pre-tensioning of the spring 80, between the punch 10 and the receiving sleeve 50 may be limited by a restricted guidance 18, 56 between the receiving sleeve 50 and the punch 10 in a length. For this purpose, a ball or a projection 56 engages into an axial groove 18 at the punch 10, which may be similar to a groove-and-spring connection. The axial groove may be provided at the inner wall of the passage channel 52 and the projection at the punch 10. According to a further configuration, a fitting pin completely passes a passage bore through the punch along the diameter of the punch and projects at the radial side walls of the punch 10. The projecting ends of the fitting pin each engage into a guidance groove in order to provide a linear guidance. It is to be understood that the form-fit restricted guidance 18, 56 may also prevent a relative rotation between the punch 10 and the receiving sleeve 50.

In order to provide a rotatable punch, which for example sets a screw, the axial groove 18 may extend completely along the circumference of the punch (not shown). A functionally similar adaptation is implementable in the combination of fitting pin and guidance groove.

If the punch 10 is moved contrary to the joining direction R, the pre-tensioning of the spring 80 firstly generates the maximum possible axial displacement between the punch 10 and the receiving sleeve 50. This maximum axial displacement is defined by the restricted guidance 18, 56. As soon as by the back movement of the punch 10 contrary to the joining direction R—generated directly by a drive or by an indirect movement via the adapter piston 30—the maximum axial displacement has been reached, the punch 10 guides the receiving sleeve 50 by means of a continuing movement contrary to the joining direction R and removes it from the component 9.

In case of a maximum axial displacement between the receiving sleeve 50 and the punch 10, the punch 10 and its working end 12 with the punch surface 16 may have reached a rest position. The rest position may be the prerequisite for pre-positioning a joining element 7 in a receiving nest 92 (see below) adjacent to the exit opening 54 of the passage channel 52 for a joining process.

When the punch 10 is moved out in the joining direction R and the punch surface 16 is located adjacent to the exit opening 54 during a joining process, then, the punch 10 and its working end 12 are located in an operating position. In the operating position (see FIG. 5b), the working end 12 blocks the receiving nest 92, so that no joining element 7 can be delivered to the receiving nest. In an alternative configuration of the setting head 1, it may be that the adapter piston 30 blocks the receiving nest 92, so that no joining element 7 can be delivered to the receiving nest 92 (see FIGS. 6 and 7).

With reference to FIGS. 3, 4 and 5 and to the sectional images of FIGS. 4b and 5b, the receiving sleeve 50 includes two holding arms 60 lying opposite to each other. The holding arms 60 are fastened outside of the passage channel 52 which may be outside at the receiving sleeve 50. The holding arms 60 may also have an elongated form and run parallel with respect to the punch axis. For fastening the holding arms 60, a fastening structure 64 is provided at a punch-facing end 62 of the holding arms 60. The fastening structure 64, which may provide fitting openings for a screw connection with the receiving sleeve 50, a snapping or a locking connection, guarantees an easy changing of the holding arms 60 in case of the wear, a failure or an adaption to a specific geometry of a joining element 7.

The holding arms 60 may be formed by metal springs with an L-shaped design. A longer L-leg 65 may include the end 62 with fastening structure 64. A shorter L-leg 66 extends laterally or radially inwardly protruding with regard to the longer L-leg 65 in the direction of the passage channel 52.

According to a further configuration, a holding releasing contour 68 may be provided at the shorter L-legs 66 at the lateral or radially inwardly protruding face side. Because the holding arms 60 and specifically the shorter L-legs 66 hold the joining element 7 in a pre-position before the start of the joining process. For this purpose, the holding releasing contour 68 is adapted in order to releasably fasten or fix the joining element 7.

In this context, the joining element 7 may be_held at the outer sections which are later pressed into the component 9 when joining the joining element 7. For this purpose, the structure of the face-sided ends of the shorter L-legs 65, which is necessary for that, clamp the joining element 7 in a releasable manner. During the joining process, the shorter L-legs 66 with their face-sided holding ends are moved in time contrary to the joining direction R relatively to the joining element 7 and laterally to it. Accordingly, a collision between the L-legs 66 and the component 9 is prevented. Due to the combination of punch 10 and receiving sleeve 50, a reverse movement may be initiated, which does without an active drive. Furthermore, the joining element 7 may be released at a point in time at which it is already partly joined into the component 9 and can no longer slip or fall out of the bond.

The holding releasing contour 68 may engage with laterally or radially inwardly directed spring forces at and may be under a head of the joining element 7. The joining element 7, e.g. a bolt, may be held at a shaft surface. Accordingly, the holding releasing contour 68 may be configured complementary to a holding section of the outside of the joining element 7, wherein the holding section at the joining element 7 is pressed into the component 9 by means of the joining process. The joining element 7 may be positioned in a form-fit and/or force-fit manner as well as releasably via the holding releasing contour 68 in the receiving nest 92 for the joining process.

The length of the longer L-leg 65 may be chosen such that the shorter L-legs 66 project into the passage channel 52 with the holding releasing contour 68 adjacent to the exit opening 54. Based on this configuration, the joining element 7 is held within the passage channel 52 adjacent to the exit opening 54. Due to this arrangement, the joining element 7 which is held by the holding arms 60 is protected of outer influences by the setting head 1 when driving towards the joint. In order to enable this arrangement of the shorter L-legs 66, they reach through a recess 58 in the receiving sleeve 50 (see FIG. 3). This recess 58 is also realizable as window or opening (not shown) in the receiving sleeve 50.

The position of the shorter L-leg 66 in coordination with the joining element 7 may be chosen such that the joining element 7 slightly projects from the passage channel 52 in the direction facing away from the punch or is flush with the end, which faces away from the punch, of the receiving sleeve 50 and the passage channel 52.

As can be recognized based on the sectional image of FIG. 4b, a holding surface 68A that may be arranged parallel to the outside of the joining element 7, here a holding surface that may be arranged parallel to the longitudinal axis of the punch 10, holds the joining element 7, which may be the outside of the head of the joining element 7, in place. A releasing surface 68B connects to or follows the holding surface 68A in the joining direction R. The releasing surface 68B may enclose an angle <90° which may be with the longitudinal axis of the punch 10 or the joining direction R. Accordingly, the releasing surface 68B is arranged radially inwardly and in an inclined manner in the joining direction R. The arrangement of the releasing surface 68B causes a joining element 7, which may be moved by the punch 10 in the joining direction R, to slip on the releasing surface 68B. In the course of that, the shorter L-legs 66 with the holding releasing contour 68 are laterally or radially pressed through the joining element 7 to the outside and release the joining element 7 (see FIG. 5b). If the movement of the punch 10 in the joining direction R continues, the joining element 7 is set into the component 9. Beside the above-described releasing function, the releasing surface 68B does, however, also realize a holding function, with which the effect of the holding surfaces 68A is complemented. Because the releasing surfaces 68B may engage under the head of the joining element 7 in order to form an axially releasable undercut in the joining direction R. This elastically or springingly releasable undercut which complements the holding surfaces 68A may support the anti-loss security of the holding ends 66. Because the holding surfaces 68A and the releasing surfaces 68B hold the joining element 7 each on their own or in combination until the punch 10 joins the joining element 7 from this hold of the holding releasing contour 68 into the component 9.

As soon as the joining element 7 has been set and the working end 12 of the punch 10 has left the operating position, the shorter L-legs 66 spring back into the initial position. In the initial position, the holding releasing contour 68 of the shorter L-legs 66 is again ready for the receiving of a joining element 7.

According to the embodiment in FIG. 2, firstly, in case of a moving of the punch 10 in the joining direction R, the joining element 7 abuts on the surface of the component 9. The receiving sleeve 50 may abut on the component 9, first. This approach can be chosen such that it fits the joining method to be carried out and/or the joining element 7 to be processed. If the punch 10 moves further in the joining direction R, the spring 80 is compressed and the punch surface 16 abuts on the joining element 7 after a process of approximation. The receiving sleeve 50 and the punch 10 carry out a reverse movement relative to each other. In this context, it is of significance that the restricted guidance 18, 56 provides the working end 12 of the punch 10 with sufficient axial leeway in the joining direction R, so that the punch 10 can set the joining element 7 completely into the component 9.

The above-described process takes place in the same manner, even if the joining element 7 was arranged completely in the passage channel 52 but adjacent to the exit opening 54. In this case, firstly, the receiving sleeve 50 instead of the joining element 7 would abuts on the component 9 before the above-described course until the concluding setting of the joining element 7 would take place.

As can be recognized based on the embodiment of the receiving sleeve 50 in FIG. 3, the joining element 7 may be held at the end of a profile track 90 in a receiving nest 92 in a pre-position for being set into the component 9. The receiving nest 92 is arranged adjacent to the exit opening 94 of the passage channel 52 in the receiving sleeve 50.

The receiving nest 92 may be open on one side, only. At this location, the profile track 90 may follow in order to feed the joining element 7 to the receiving nest 92. According to a further embodiment, the profile track 90 may be formed adjacent to the receiving sleeve 50 by a profile hose 94. This profile hose 94 may have a cross-sectional form adapted to the joining element 7, in order to be able to shoot the joining element 7 via the profile hose 94, which may be pneumatically.

According to a further embodiment of the profile hose 94, the same may have a T-shaped cross section for head-guided joining elements 7.

In order to achieve short cycle times when generating or establishing a number of joints, the joining element 7 may be delivered to the setting head 1 via the profile hose 94, while the punch 10 is located in the operating position. Accordingly, the working end 12 of the punch 10 or the adapter piston 30 blocks the way of delivery of the joining element 7 to the receiving nest 92, as is shown in FIGS. 6 and 7. In this case, the joining element 7 can be delivered to the setting head 1 only until the joining element 7 abuts the adapter piston 30 or the punch 10 (not shown).

As the joining element 7 does not yet have to be supplied to the receiving nest 92, an actuator 100 which may be used for the delivery of the joining element 7 into the receiving nest 90 remains in its rest position.

For the delivery of the joining element 7 to the receiving nest 92, the setting head 1 may be displaced such that the receiving nest 92, i.e. the axial end portion of the receiving sleeve 50, is arranged flush with the profile hose 94 (see FIG. 8). The arrow schematically illustrates the delivery movement of the joining element 7 along the profile hose 94 or generally along a delivery path.

The joining element 7 may be supplied with air in the profile hose 94 and in the position in front of the receiving nest 92, in order to deliver it pneumatically as far as possible to the receiving nest 92. The air pressure may be applied sufficiently long at the delivered feeding element 7 so that a possible rebound of the blocking adapter piston 30 or punch 10 in the receiving nest 92 is decreased. According to different embodiments, the joining element 7 may be pneumatically shot to the receiving nest 92 when the receiving nest 92 is free and accessible or when the receiving nest 92 is still blocked.

The shorter L-legs 66 with the holding releasing contour 68 together with the receiving sleeve 50 form the receiving nest 92. As the receiving sleeve 50 limits the receiving nest 92 opposite to the profile hose 94, the joining element 7 is delivered under the punch 10 and not beyond it. Furthermore, the shorter L-legs 66 together with the holding releasing contour 68 may form a continuation of the profile track of the profile hose 94 up to the receiving nest 92.

The shorter L-legs 66 tighten the receiving nest 92 and thus the end of the profile track 94 by means of the springing arrangement to a smaller width than the joining element 7 may be configured. Therefore, the delivering air stream in the profile hose 94 may not be sufficiently strong for pressing or moving the joining element 7 against the spring force of the shorter L-legs 66 into the receiving nest 92.

For this reason, the actuator 100 is provided, which displaces the joining element 7 into the receiving nest 92 mechanically or electromechanically or electromagnetically. This is illustrated in FIGS. 10 and 11, where a pneumatic cylinder 102 may drive a knee lever mechanism 104 in order to move the actuator 100. The actuator 100 is displaced or rotated by means of the pneumatic cylinder 102 so far that the joining element 7 may have completely been moved into the receiving nest 92. It is then held by the holding releasing contour 68 of the shorter L-legs 66 in the receiving nest 92 (see FIG. 11).

According to a further embodiment, the position of the actuator 100 may be monitored in the course of the delivery of the joining element 7 by the actuator 100. The position of the drive of the pneumatic cylinder 102, be monitored. Because based on the position of the actuator 102 and/or the position of the drive 100, it can be recognized whether the joining element 7 has been displaced into the receiving nest 92 completely or not.

The detected position of the actuator 100 or the detected position of the drive 102 may be calibrated to the following situations: If the actuator 100 or the pneumatic cylinder 102 drives too far, no joining element 7 is present which could be displaced into the receiving nest 92. If the actuator 100 or the pneumatic cylinder 102 does not drive far enough, the joining element 7 has either not arrived at the correct place in the receiving nest 92 between the L-legs 66 or a second joining element 7 is erroneously located in the insertion portion into the receiving nest 92.

After the joining element 7 has been delivered to the receiving nest 92 (see FIG. 10), the actuator 100 is displaced into its rest position again. Now, the setting head 1 drives in the direction of component 9 and the above-described joining process of the joining element 7 can begin.

Accordingly, the joining method may once again be summarized as follows. Firstly, in a first step S1, a new joining element 7 is delivered via an element delivery, which may be the profile hose 94, into the pre-position adjacent to the receiving nest 92. During this step S1, the punch 10 or the adapter piston 30 blocks the receiving nest 92. The joining element 7 may be supplied to the pre-position before the receiving nest 92, when the receiving nest 92 is no longer blocked.

Once the punch 10 has been displaced into its rest position, the joining element 7 is moved into the holding position between the holding ends 66 of the holding arms 68 (S2). As the joining element 7 is now located in the receiving nest 92, the punch is moved from the rest position in the joining direction R in a next step S3. During this movement, the joining element 7 is located upstream with a distance in the holding position in the receiving nest 92 of the punch surface 16 of the working end 12 of the punch 10. Due to the above-mentioned movement of the punch 10, an abutting of the joining element 7 or of the receiving sleeve 50 on the component 9 then takes place in step 4. After that, the punch 10 is displaced in the passage channel 52 relative to the receiving sleeve 50 and against the spring pre-tensioning of the spring 80 between the punch 10 and the receiving sleeve 50 (step S5). After that, the releasing of the joining element 7 from the holding position in the receiving nest 92 between the holding ends 66 takes place by means of the punch 10 with the help of the working end 16 of the punch 10 in step S6. Due to the further movement of the punch 10 in the joining direction, the joining element 7 is then joined into the component 9 (step S7). Finally, the punch 10 is moved from its operating position for joining the joining element 7 into the rest position, wherein the punch 10, supported by the spring pre-tensioning between the punch 10 and the receiving sleeve 50, is removed from the passage channel 52 in a form-locking limited manner (step S8).

The invention claimed is:
1. A setting head for a joining device having the following features:

a. a punch movable in longitudinal direction, so that a joining element is joinable into a component by a punch surface arranged at a working end of the punch,
b. a receiving sleeve with a passage channel, the sleeve being concentrically and axially movable with the punch in the passage channel adjacent to the working end of the punch on the same, and
c. two holding arms being arranged opposite to each other and outside of the passage channel at the receiving sleeve each provide at least one laterally inwardly protruding holding end, so that with the at least two holding ends, the joining element is positionable adjacent to an exit opening, facing away from the punch, of the passage channel and is releasable by the working end of the punch, wherein
d. the receiving sleeve is spring-pretensioned relative to the punch and movable limitedly in the longitudinal direction of the punch, so that in a rest position of the punch, the working end is arranged within the passage channel and removed from the exit opening and in an operating position of the punch adjacent to the exit opening and
e. the receiving sleeve and the punch are guided in a form-fit manner next to each other, so that the receiving sleeve is axially displaceable in a rotation-free manner relative to the punch, wherein
f. the relative axial displacement between the punch and the receiving sleeve is limited by a restricted guidance between the receiving sleeve and the punch in a length, wherein the restricted guidance is realized as one of the following:
   f1. a ball or a projection engaging into an axial groove at the punch,
   f2. an axial groove at an inner wall of the passage channel and a projection at the punch, or
   f3. a fitting pin completely passing a passage bore through the punch along the diameter of the punch and projecting at radial side walls of the punch and the projecting ends of the fitting pin each engaging into a guidance groove in order to provide a linear guidance.

2. The setting head according to claim 1, in which the holding arms are provided L-shaped and a shorter L-leg projects laterally inwardly with a holding-releasing contour for the joining element into the passage channel of the receiving sleeve.

3. The setting head according to claim 2, in which the holding-releasing contour includes at least a form-fit hold for the joining element as well as an inclined releasing surface arranged at a acute angle with respect to the joining direction R for the punch-sided releasing of the joining element from the holding releasing contour.

4. The setting head according to claim 2, in which a longer L-leg of the L-shaped holding arm provides a fastening structure with which the L-shaped leg is fixable interchangeably at the receiving sleeve.

5. The setting head according to claim 1, in which adjacent to the exit opening of the passage channel, the receiving sleeve includes a profile track open at one side, the track being formed at least in sections at opposite sides by the holding ends and with which the joining element is deliverable to a joining position in the joining direction R under the punch surface of the punch.

6. The setting head according to claim 1, in which the holding ends are elastically spring-pretensioned laterally into the passage channel by means of the holding arms.

7. The setting head according to claim 5, in which the holding ends are elastically spring-pretensioned laterally into the passage channel, and in which the profile track, which is open at one side, in combination with the spring-pretensioned holding ends, forms a receiving nest for a joining element, into which the joining element is displaceable by means of a mechanical actuator.

8. The setting head according to claim 7, in which a movement of the actuator is carried out with its position being monitored, so that a positioning of the joining element inside or outside of the receiving nest is determinable.

9. A metal sheet press with a setting head according to claim 1.

10. A setting device with a setting head according to claim 1.

11. A joining method of a joining element with a setting head according to claim 1, having the following steps:
    a. with the punch in a rest position, displacing a joining element into a holding position between the holding ends of the holding arms,
    b. moving the punch from the rest position in a joining direction R, wherein in the holding position, the joining element is positioned upstream at a distance to the punch surface of the working end of the punch,
    c. placing the joining element or the receiving sleeve on a component, after that,
    d. displacing the punch in the passage channel relative to the receiving sleeve and against the spring pre-tensioning between the punch and the receiving sleeve,
    e. releasing the joining element from the holding position between the holding ends with the working end of the punch and joining the joining element into the component.

12. The joining method according to claim 11, in which the joining element is displaced into the holding position by means of an actuator.

13. The joining method according to claim 11 with the further step:
    delivering a new joining element via an element delivery into a pre-position adjacent to a receiving nest, while the punch or the adapter piston blocks the receiving nest or while the receiving nest is freely accessible.

14. The joining method claim 11 with the further step:
    moving the punch from an operating position for joining the joining element into the rest position, wherein the punch, supported by the spring pre-tensioning between the punch and the receiving sleeve is removed form-fit in a limited manner at least partly from the passage channel.

* * * * *